June 3, 1930.  J. L. DRAKE  1,761,196
SHEET GLASS SURFACING APPARATUS
Filed Feb. 19, 1926    2 Sheets-Sheet 1

Inventor
John L. Drake.
By Frank Fraser
Attorney

June 3, 1930.  J. L. DRAKE  1,761,196
SHEET GLASS SURFACING APPARATUS
Filed Feb. 19, 1926   2 Sheets-Sheet 2

Inventor
John L. Drake.
By Frank Fraser
Attorney

Patented June 3, 1930

1,761,196

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

SHEET-GLASS-SURFACING APPARATUS

Application filed February 19, 1926. Serial No. 89,267.

The present invention relates to sheet glass surfacing apparatus.

An important object of the invention is to provide a sheet glass surfacing apparatus including a plurality of surfacing members, some of the surfacing members being adapted to be rotated in one direction, while some of the other of said surfacing members are adapted to be rotated in a direction opposite to the first mentioned surfacing members.

Another object of the invention is to provide a sheet glass surfacing apparatus wherein a plurality of groups of surfacing members are used, including means for positively rotating each group about its own independent axis, the path of the surfacing members of one of the groups overlapping the path of some of the surfacing members of another group.

A still further object of the invention is to provide an apparatus of this nature, including a plurality of rotatable shafts, a group of surfacing members associated with each shaft, each of said shafts being positively driven, the direction of rotation of some of the shafts being in a direction opposite to the rotation of some of the other shafts, the path of some of the surfacing members overlapping the path of rotation of some of the other surfacing members.

A still further object of the invention is to provide sheet glass surfacing apparatus wherein a sheet of glass is rotatably supported, including a plurality of rotatable shafts arranged above the rotatable sheet, each of the shafts having associated therewith a group of surfacing members, the shafts being rotated in a manner that some of them rotate in the same direction as the sheet, while the others rotate in the opposite direction, the surfacing members of some of the groups being adapted to intermesh with the surfacing members of the other groups, thus facilitating a uniform surfacing action upon the sheet.

Other objects and advantages of the invention will become apparent during the course of the following description.

Figure 1:
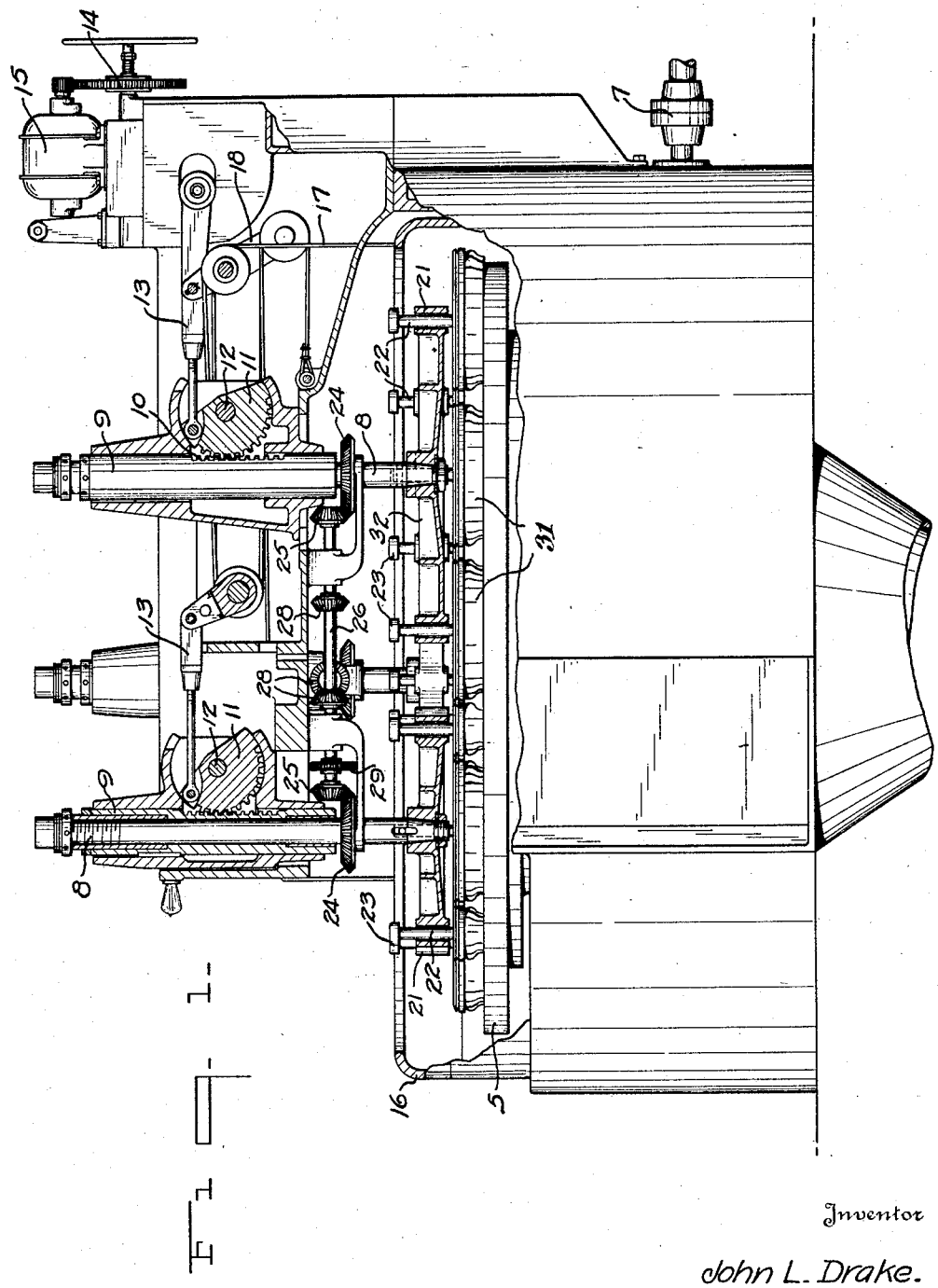
Figure 2:
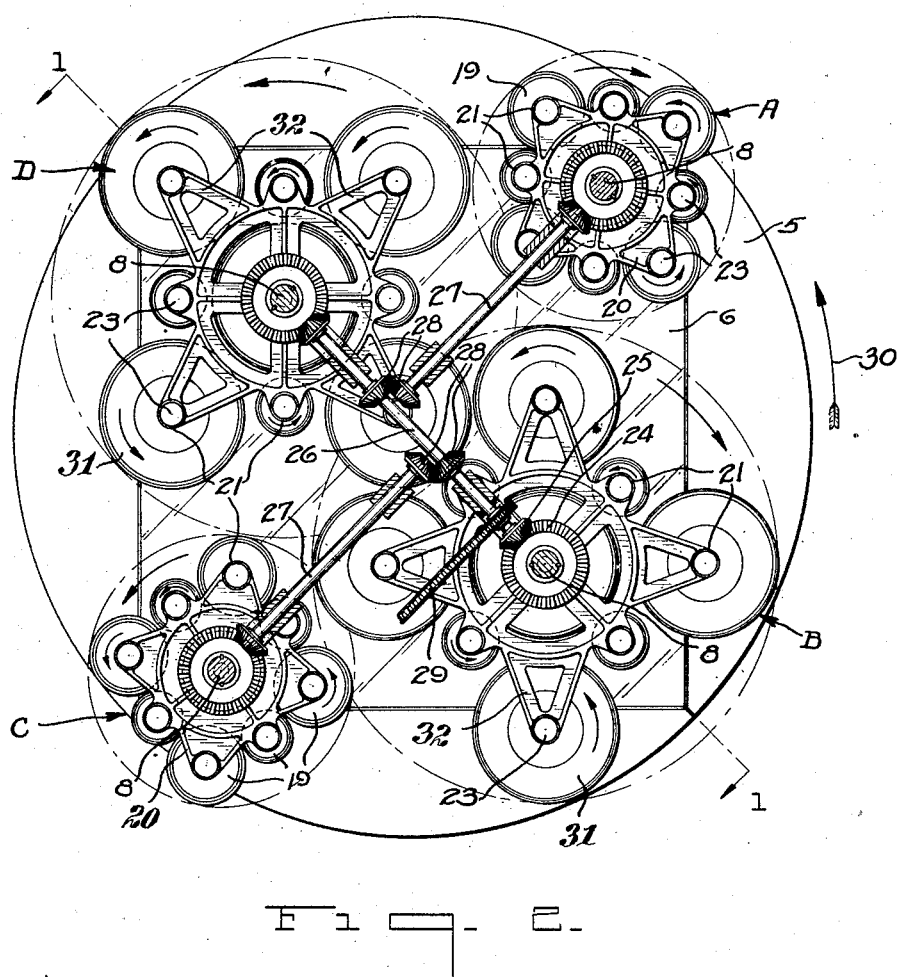

In the drawings wherein like numerals are employed to designate like parts throughout the same, Fig. 1 is a side elevation of my improved construction, partly in section, for the purposes of illustration, and Fig. 2 is a diagrammatic plan view thereof.

The present invention relates to the production of that type of sheet glass whose surfaces are subjected to the action of surfacing elements. Ordinarily in the production of this type of glass a blank is subjected to various grades of abrasive to remove irregularities and reduce the same to the desired thickness. After the blank has thus been properly ground it is polished. There are various processes by which this surfacing of the blank is accomplished. In the continuous process a sheet of glass is moved upon a table beneath a plurality of grinding and polishing members rotatably arranged thereabove. In another type of apparatus the sheet is held upon a rotatable table, being positively rotated with the surfacing elements resting upon the said sheet in a manner that rotation of the sheet, through frictional contact with the surfacing elements, causes their rotation.

The present invention is an aim to provide surfacing apparatus capable of surfacing a blank of glass more uniformly than heretofore. Instead of permitting the surfacing members to be rotated by frictional contact with the sheet, thus having all of the surfacing members moving in the same direction, means are provided to positively drive a plurality of groups of surfacing members in a manner that some of them rotate with the sheet, while others rotate in a direction opposite to the rotation of the sheet.

In Fig. 1 the numeral 5 designates a table which may be provided with a recess in which a sheet 6 may rest. In the type of table shown, the sheet 6 is freely supported in a recess, but obviously the present invention can be worked equally well where the sheet is held in place by some suitable cement such as plaster of Paris.

The table 5 is positively driven as through the connection 7 to a source of power. Arranged above the rotatable table 5 are a plurality of rotatable shafts 8. Each of the shafts 8 operates through a sleeve 9 having a racked portion 10 engageable with a segmental gear 11, rocked about a shaft 12 by means of a pitman 13, associated with a gear drive 14, driven by a motor or the like 15. In Fig. 1 the shafts 8 are shown in an operative position, and by rocking the segmental gear 11 as described, the sleeve 9 is raised, causing the shaft 8 to be raised.

A guard 16, which is raised and lowered simultaneously with the shafts 8, is connected by means of suitable cables 17 to the link 18 also operated by means of the pitman 13.

In Fig. 2 are shown four shafts 8, each shaft having associated therewith a group of surfacing members, the groups of surfacing members being designated by the letters A, B, C and D. The surfacing members of the groups A and C are designated 19 and are carried by spiders 20 while the surfacing members of the groups B and D are indicated 31 and are carried by spiders 32. Each spider carries a plurality of bearings 21 which receive therethrough the stub shafts 22 of the respective surfacing members. The ends 23 are provided on the stub shafts to prevent accidental displacement of the blocks when they are raised into an inoperative position. Each of the shafts 8 has keyed thereon a suitable gear such as a bevel gear 24 adapted to mesh with a beveled pinion 25, carried on the shafts 26 or 27, the shaft 27 being driven by the shaft 26 through means of the beveled pinions 28. The master shaft 26 is connected to a source of power by means of the sprocket chain 29 or some other form of connection.

By looking at Fig. 2, it will be seen that the sheet is indicated by the arrow 30 as rotating in a counter-clockwise direction. The two groups of polishers C and D each rotate about their individual shaft 8 in the same direction, namely, counter-clockwise. Of course it is to be understood to obtain this movement the sprocket chain 29 is rotatably associated with the source of power, thus driving the shafts 26 and 27. While the groups of polishers C and D rotate in a counter-clockwise direction, the groups A and B rotate about their centers 8 in a clockwise direction.

As clearly shown in Fig. 2, the groups of polishers are arranged in a manner that the paths of one group overlap the path of the other groups, this being accomplished by so mounting the individual blocks 19 that they can intermesh. This can be easily controlled as all of the groups are positively driven.

By carefully studying the diagrammatic showing in Fig. 2, it will be seen that the surfacing action upon the sheet 6 is much more uniform than in the constructions heretofore used.

Considering the case where the surfacing members are driven by frictional contact with the sheet, it will be seen that the surfacing members rotate in the same direction as the sheet. In this case there is much more relative movement between the sheet and the surfacing member at the center of the sheet than at the edges due to the fact that the surfacing member and sheet can almost be considered to be synchronized at the outer portion of the sheet as they are moving in the same direction and almost at the same speed. As compared with this similar speed at the outer edge of the sheet, it will be seen that the surfacing member at the center is really rotating against the direction of the sheet, thus giving more relative movement.

In the present arrangement these two actions with and against the sheet are neutralized due to the fact that four groups of surfacing members are provided, two groups rotating in a counter-clockwise direction, and two groups rotating in a clockwise direction. Although four groups have been specified, it is to be understood that no limitations are intended as to the number of groups or number of polishers used.

With the arrangement shown, the relative movement at the center of the sheet would be less than at the edges of the sheet if the groups did not overlap, but by permitting the path of one group of blocks to overlap the path of another group of blocks, the surfacing action is uniform throughout the entire surfacing of the sheet.

It is to be understood that the form of the invention herewith shown and described is to be taken as the preferred embodiment of the same, and that variuos changes in the shape, size and arrangement of parts may be resorted to without departing from the spirit of the invention or the scope of the subjoined claims.

Claims:

1. The combination with a table adapted to support a glass sheet to be surfaced, of a plurality of groups of surfacing members resting upon the glass, a second plurality of groups of surfacing members also resting upon the glass and arranged alternately with the first named groups of surfacing members, the surfacing members of the second named groups being smaller than the surfacing members of the first named groups, and means for effecting the rotation of all of said groups, the surfacing members of the second named groups intermeshing with the surfacing members of the first named groups.

2. The combination with a table adapted to support a glass sheet to be surfaced, of a plurality of groups of surfacing members resting upon the glass, a second plurality of groups of surfacing members also resting upon the glass and arranged alternately with the first named groups of surfacing members, the surfacing members of the second named groups being relatively smaller than the surfacing members of the first named groups, and means for positively rotating all of said groups, the surfacing members of the first named groups intermeshing with one another and the surfacing members of the second named groups intermeshing with the surfacing members of the first named groups.

3. The combination with a table adapted to support a glass sheet to be surfaced, of two groups of surfacing members resting upon the glass sheet, means for rotating said groups in opposite directions relative to one another, two additional groups of surfacing members also resting upon the glass sheet, the additional groups being arranged alternately with the first mentioned groups and the surfacing members of said second mentioned groups being smaller than the surfacing members of said first mentioned groups, and means for positively driving the second mentioned groups in opposite directions relative to one another, the surfacing members of the first mentioned groups intermeshing with one another and the surfacing members of the second mentioned groups intermeshing with the surfacing members of said first mentioned groups.

4. The combination with a table adapted to support a glass sheet to be surfaced, of a substantially horizontal shaft arranged above the table, a group of polishing members arranged at either end of said shaft and operatively connected therewith, means for driving said shaft to effect rotation of said groups in opposite directions relative to one another, a pair of substantially horizontal shafts extending at substantially right-angles to the first named shaft and operatively connected therewith, a group of polishing members arranged at the outer end of each of said second named shafts and operatively connected therewith, and means for driving said second named shafts to effect rotation of the last named groups of polishing members in opposite directions relative to one another, the second named groups of polishing members being arranged alternately with the first named groups of polishing members.

5. The combination with a table adapted to support a glass sheet to be surfaced, of a substantially horizontal shaft arranged above the table, a group of polishing members arranged at either end of said shaft and operatively connected therewith, means for driving said shaft to effect rotation of said groups in opposite directions relative to one another, a pair of substantially horizontal shafts extending at substantially right-angles to the first named shaft and operatively connected therewith, a group of polishing members arranged at the outer end of each of said second named shafts and operatively connected therewith, the second named groups of polishing members being arranged alternately with the first named groups of polishing members, and means for driving said second named shafts to effect rotation of the last named groups of polishing members in opposite directions relative to one another, the polishing members of the first named groups intermeshing with one another and the polishing members of the second named groups intermeshing with the polishing members of the first named groups.

Signed at Toledo, in the county of Lucas and State of Ohio, this 16th day of February, 1926.

JOHN L. DRAKE.